Jan. 20, 1925.
T. GOODMAN
EYE PROTECTING MASK
Filed Nov. 8, 1922
1,523,521
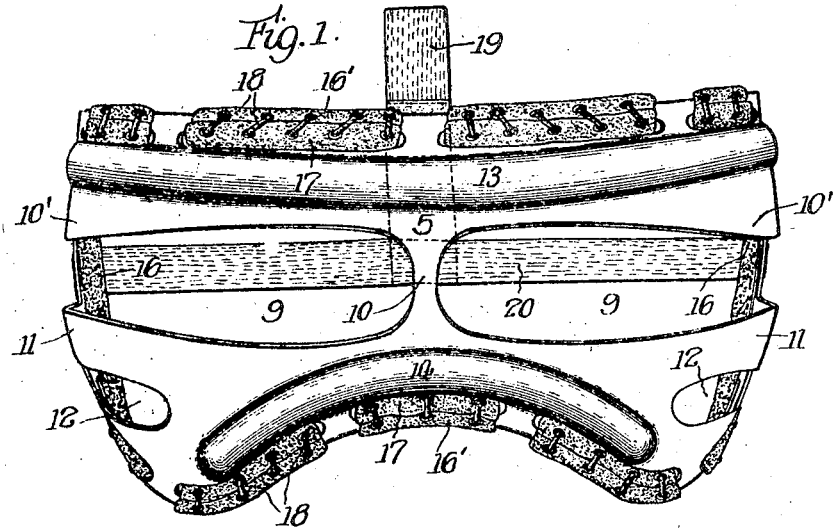
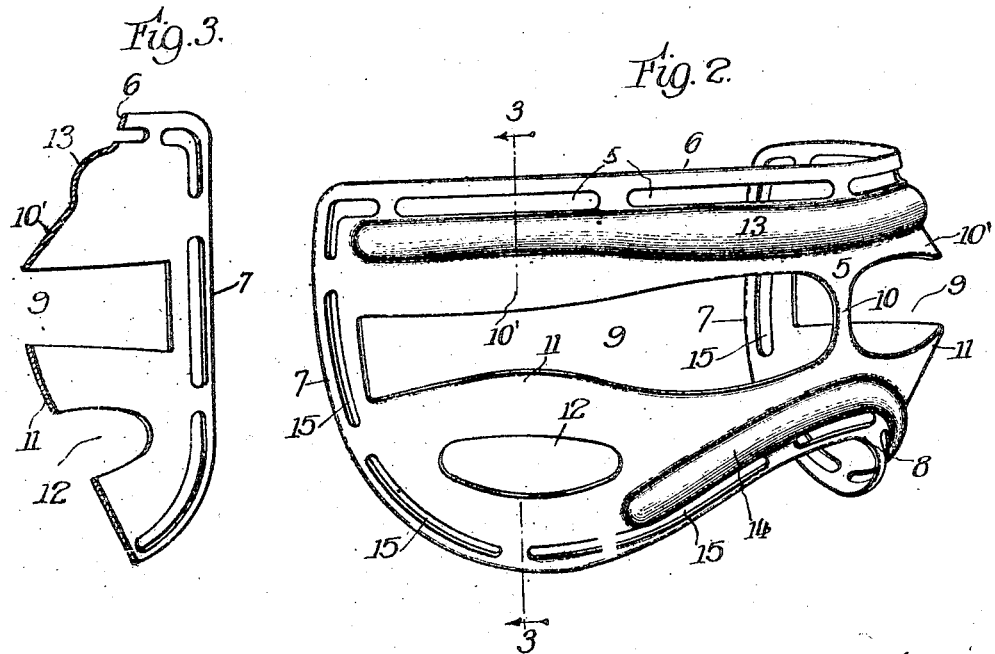
Witness:
A. J. Sauser
Inventor:
Thomas Goodman,
By Samuel N. Pond, Atty.

Patented Jan. 20, 1925.

1,523,521

UNITED STATES PATENT OFFICE.

THOMAS GOODMAN, OF MELROSE PARK, ILLINOIS.

EYE-PROTECTING MASK.

Application filed November 8, 1922. Serial No. 599,629.

*To all whom it may concern:*

Be it known that I, THOMAS GOODMAN, a citizen of the United States, residing at Melrose Park, in the county of Cook and State of Illinois, have invented certain new and useful Improvements in Eye-Protecting Masks, of which the following is a specification.

This invention relates to masks and has reference more particularly to a device designed to protect the eyes and eyeglasses of the wearer against accidental injury when playing such games as golf, hockey and tennis. It is well-known that in the playing of these games serious injury and sometimes loss of vision in one eye occurs as the result of an accidental blow by the ball on the eye or eyeglass of the player; and the main object of the present invention is to provide a simple, light and easily worn protective device, especially adaptable to persons wearing eyeglasses, which will afford perfect protection against injury and the breakage of eyeglasses, without in the least obstructing the clear vision of the wearer.

In order that my invention may be fully understood as to its structural features, mode of use, and advantages, I have, in the accompanying drawing, illustrated a practical and preferred embodiment thereof, in which—

Fig. 1 is a front elevation of the mask;

Fig. 2 is a perspective elevation of the mask frame; and

Fig. 3 is a cross-section of the mask frame taken on the line 3—3 of Fig. 2.

Referring to the drawing, 5 designates as an entirety the sheet metal frame or body of the mask, which is preferably made of aluminum in order to combine lightness and strength. This frame is of a generally concavo-convex form so as to conform approximately to the general surface curvature of the forehead, temples and cheek bones of the human face, having a substantially horizontal and approximately semi-circular upper margin 6, downwardly and forwardly curved side margins 7, and an upwardly curved or concave lower margin 8 straddling the nose of the wearer. Substantially mid-height of the frame are a pair of symmetrical long vision openings 9 divided by a central vertical web member 10 and extending from the latter to a short distance inwardly of the side margins 7. These vision openings 9 are of sufficient width to afford a wide range of vision therethrough to the wearer, but at the same time their longitudinal margins are sufficiently close together to bar the passage therethrough of an object as small as a golf ball, as well as to prevent any surface portion of the latter from striking an eyeglass worn by the user of the mask. An important feature of the mask resides in a provision for adequately protecting the outer ends of the eyeglass lenses which lie farthest from the face, this consisting in bulging outwardly the upper and lower portions 10' and 11 of the frame which constitutes the marginal or bounding portions of the vision openings at these points, as most clearly shown in Figs. 2 and 3.

Openings 12 are preferably formed in the lower side portions of the mask frame which lie opposite the cheeks of the wearer, these openings serving both to lighten the structure and afford increasing ventilation.

Increased stiffness and strength to resist blows is afforded by a pair of protuberent reinforcing ribs 13 and 14, the former of which lies between the upper margin 6 and the vision openings 9 and extends substantially the full width of the mask frame, while the latter lies slightly above and substantially parallel with the lower concave margin 8.

In the marginal portions 6, 7 and 8 of the frame are formed narrow longitudinal slots 15 to facilitate the attachment of suitable marginal pads 16 to the inner side of the frame. These pads are herein shown as provided with flap extensions 16' and 17 passing over the outer edges and through the slots 15 respectively and united by lacings 18. The mask is secured in place on the face of the wearer by the usual elastic top and side tapes 19 and 20.

By reason of its described skeleton structure, and especially when made in a light metal such as aluminum, my improved mask affords a device that can be worn by a player with no discomfort or interference of vision, and at the same time affords perfect protection to the eyes and glasses from accidental contact with the ball while the latter is in play. The mask has been designed more particularly with reference to its use by golf players, but manifestly it may be worn with equal advantage by persons engaged in other games in which a ball is volleyed, such as tennis, hockey and the like.

I claim—

1. An eye-protecting mask of the character described, comprising a sheet metal concavo-convex frame adapted to cover the lower forehead, eyes, nose and cheeks, said frame having a central vertical web portion overlying the bridge of the nose, long narrow vision openings extending from said central web approximately to the opposite side margins of the frame, and a continuous reinforcing rib extending substantially the full width of the frame and lying between the upper margin of the frame and the upper margins of said vision openings.

2. An eye-protecting mask of the character described, comprising a sheet metal concavo-convex frame formed with a substantially horizontal upper margin adapted to fit over the forehead, downwardly and forwardly curved side margins adapted to overlie the cheeks, a concave lower margin adapted to straddle the nose, a pair of relatively long and narrow vision openings, and a protuberant reinforcing rib disposed slightly above and parallel with said concave lower margin.

3. An eye-protecting mask of the character described, comprising a sheet metal concavo-convex frame formed with a substantially horizontal upper margin adapted to fit over the forehead, downwardly and forwardly curved side margins adapted to overlie the cheeks, a concave lower margin adapted to straddle the nose, a pair of relatively long and narrow vision openings, a continuous reinforcing rib extending substantially the full width of the frame and lying between said upper margin and the upper margins of said vision openings, and a protuberant reinforcing rib disposed slightly above and parallel with said concave lower margin.

THOMAS GOODMAN.